Patented Apr. 30, 1935

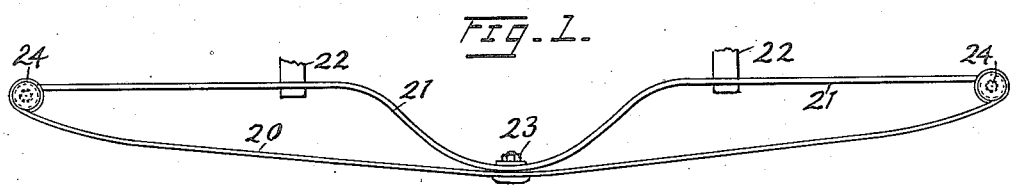

1,999,602

UNITED STATES PATENT OFFICE 1,999,602

BUMPER

George W. Veale, Cleveland Heights, Ohio, assignor to Eaton Manufacturing Company, Cleveland, Ohio, a corporation of Ohio Application August 25, 1931, Serial No. 559,246

2 Claims. (Cl. 293—55)

This invention relates to bumpers for motor vehicles, and particularly to the end construction of bumpers of the single impact bar type.

It is one of the objects of the present invention to provide a single bar bumper capable of withstanding great shock.

A further object of the present invention is to provide a bumper which will present an attractive appearance and be of such substantial construction as to afford the required protection to the vehicle.

A still further object is to provide a bumper of the type referred to, which will be economical to manufacture and easy to assemble.

Other objects of the invention and the features of novelty will be apparent from the following description, taken in connection with the accompanying drawing, of which, Figure 1 is a plan view of a bumper of a type employing my invention.

Fig. 2 is an enlarged plan of the form of end construction shown in Fig. 1 with certain parts shown in section on the line 2—2 of Fig. 3.

Fig. 3 is a front elevation of the end construction shown in Fig. 2, with parts broken away and shown in section.

Fig. 4 is a view similar to Fig. 2 but illustrating another form of end construction embodying my invention.

Fig. 5 is a front elevation of the end construction shown in Fig. 4, with parts broken away and shown in section.

Fig. 6 is a view similar to Fig. 2 but illustrating another form of end construction embodying my invention.

Fig. 7 is a front elevation of the end construction shown in Fig. 6, with parts broken away and shown in section.

Fig. 8 is a view similar to Fig. 2, but illustrating another form of end construction embodying my invention, and Fig. 9 is a front elevation of the end construction shown in Fig. 8, with parts broken away in order to more clearly show other parts.

Referring to the drawing, Fig. 1 illustrates a front bumper comprising a relatively wide impact or front bar 20, and a narrower rear bar 21. The rear bar is secured to the usual side members 22 of the automobile, and is curved to meet the front bar as at 23, according to common practice. The front and rear bars are also secured together at the ends, as at 24, and this invention is directed to novel means for securing these ends together. It should be understood, however, that the invention is not limited to front bumpers, but is equally applicable to rear bumpers, nor is it limited to any particular widths or thicknesses of bars, it being possible to vary the proportions of these members if desired.

Referring to Figs. 2 and 3, it will be seen that the front or impact bar 25 is bent around at its end so as to form a substantially cylindrical portion or eye 26. This eye may be formed in any desired manner. The rear bar 27 likewise has a cylinder or eye 28 formed at its end. A part of the eye 26 is cut out, as indicated at 36, so that the smaller eye 28 can be inserted in the eye 26. The part of the front bar above and below the eye 28 is not cut out, but complete cylinders are formed at these points. This leaves a shoulder 35 against which the edge of the rear bar abuts. A bolt 29, having a relatively large head 30, and equipped with a conical shoulder 31 is inserted in the eyes 26 and 28. The conical shoulder on the head of the bolt serves to center the bolt with respect to the eye 28.

The shank of the bolt 29 is preferably of about the same diameter as the interior of the eye 28 and is of such length as to extend below the bottom of the eye 28, but not below the bottom of the eye 26 in the front bar. A washer 32, preferably of about the same outside diameter as the inside of the eye 26, is fitted on the bolt, together with a lock washer 33 and a nut 34. The washer 32 aids in centering the lower end of the bolt in the eyes, and prevents relative displacement of the eyes 26 and 28 in case of an impact. When the nut 34 is tightened the head 30 of the bolt 29 is drawn down against the top of the front bar, while the rear bar is drawn up so as to abut firmly against the shoulder 35 formed in the eye 26.

The form of end construction shown in Figs. 2 and 3 provides a connection which has an attractive appearance, and in which the parts are held tightly together, so as to eliminate rattling. The top of the rear bar is held rigidly against the top of the slot in the eye 26 while the nut is nested within the bottom of the eye where it is protected and is out of sight.

A different form of end construction is shown in Figures 4 and 5. In this modification an eye 49 is formed at the end of the front bar 40. A narrow slot 48 is cut in this eye, preferably near the center, as may best be seen in Fig. 5. The rear bar 41 is given a half turn or twist adjacent its outer end so that it will enter the slot 48 in the eye 49. The end of the twisted portion is rounded off to fit the inside of the eye, and has a hole 42 punched in it near its center. A bolt 43 having a relatively large head 44 with a conical shoulder 45 is inserted in the eye 49. This bolt projects through the hole 42 in the back bar, and a washer 46 and a nut 47 are fitted on the bottom of the bolt. The shoulder on the head of the bolt centers the bolt in the eye, while the nut on the bottom secures the back bar tightly against the top 48' of the slot in the cylinder. As in the other form of end construction, the nut is placed within the cylinder where it is protected and where it is out of sight. The end of the back bar may be cut to fit the interior of the cylinder in the front bar so that it will locate itself, making it unnecessary to provide additional centering means for the bottom of the bolt. It will be seen that the large flat surface of the twisted portion of back bar which is in contact with the slot in the eye of the impact bar provides ample bearing surface between these two members, while the contact between the eye and the edge of the twisted portion will prevent shearing of the bolt in case of a severe impact.

A somewhat different form of end construction is shown in Figs. 6 and 7. This construction is similar to that shown in Figs. 2 and 3, inasmuch as it contemplates the use of eyes 52 and 53 on both the front bar 50 and the rear bar 51. This construction differs from that shown in Figs. 2 and 3 in that it employs a larger eye on the back bar, and has the eyes eccentrically mounted, as may best be seen in Fig. 6. A bolt 54 is placed within the eyes to secure the two bars together. It will be noticed that this bolt is mounted in the center of the eye 52 but is not in the center of the eye 53. As may be seen from Fig. 6, the eye 53 on the back bar projects a little outside of the eye 52 on the front bar. As the eyes are eccentrically mounted, the edges of the eyes abut for a part of their circumference and this increases the area of contact between the two bars. In the end shown in Figs. 2 and 3, the only contact between the two bars is on one edge of the back bar. In this style of bumper, the bottom of the bolt is not held by the back bar, so a washer 55 is placed on the bolt above the nut 56 to keep the bolt centered in the eye in the front bar.

Another modification is shown in Figs. 8 and 9. This modification, as do the others shown in this application, contemplates the use of an eye or cylinder 61 formed on the end of the front bar 60. A narrow slot 62 extending from the bottom edge to a short distance above the center is cut in this cylinder. The back bar 63 has a semi-circular bend 64 adjacent the end and this bend is proportioned so as to fit the inside of the cylinder 61. The end of the rear bar is placed in the cylinder of the front bar by sliding the bar up in the slot 62. A pair of aligned holes 65 are provided in the front and rear bars, and rivets 66 are placed in these holes to fasten the two bars together.

One of the advantages of this form of construction is that the rear bar reinforces and strengthens the eye on the front bar. This is very important as bumpers are frequently constructed with impact bars made of relatively thin material which may be deformed by a severe impact.

A cover is provided for the eye, the cover taking the form of a bolt 70 having a very large head 71, the bolt extending through the eye to a cup-shaped washer 72 on the bottom. A nut 73 secures the bolt and washer in place. The head 71 as shown is composed of a disc 74 surrounding the bolt and a thin sheet metal cover 75 enclosing the bolt and the disc. The bolt may be countersunk or otherwise secured in the disc, while the disc is provided with a shoulder 76 adapted to engage the top of the eye 81, and an annular flange 77 which will fit inside this eye. The sheet metal cover 75, which extends over the top of the bolt and the disc, is carried down and crimped over the edges of the disc so that this assembly is permanently fitted together. The cover 75 may be suitably plated or polished so as to present an attractive appearance. Though the bolt shown in these figures has a head built up from several parts, it is obvious that this bolt might be made with an integral head similar to that shown in the other figures accompanying this application.

Having thus described my invention what I claim as new is:

1. In a bumper end construction, an impact bar, an eye at the end of said impact bar, a cut-out portion forming a slot and a shoulder on the inner side of said eye, a rear bar, an eye on the end of said rear bar, said eye being disposed eccentrically in said slotted eye, a portion of the edge of the eye on the rear bar abutting the shoulder on the eye on the impact bar, a bolt having a head engaging and closing the upper end of said eye, said bolt extending through the eye on said rear bar, a nut on said bolt within said first mentioned eye, said nut and bolt co-operating to clamp said bars and the head of the bolt in position.

2. In a bumper end construction, an impact bar, an eye at the end of said impact bar, a slot in the inner side of said eye, said slot extending from the bottom of the eye to a point above the mid-point of said eye, a rear bar projecting through said slot, the end of the rear bar within said eye being curved to abut the interior of said eye, said rear bar and said eye having aligned holes therein, and means extending through said holes to secure said bars in operative position.

GEORGE W. VEALE.